(12) United States Patent
Wright et al.

(10) Patent No.: US 10,558,797 B2
(45) Date of Patent: Feb. 11, 2020

(54) METHODS FOR IDENTIFYING COMPROMISED CREDENTIALS AND CONTROLLING ACCOUNT ACCESS

(71) Applicant: Duo Security, Inc., Ann Arbor, MI (US)

(72) Inventors: Jordan Wright, Ann Arbor, MI (US); Jon Oberheide, Ann Arbor, MI (US)

(*) Notice: Subject to any disclaimer, the term of this patent is extended or adjusted under 35 U.S.C. 154(b) by 0 days.

(21) Appl. No.: 15/659,864

(22) Filed: Jul. 26, 2017

(65) Prior Publication Data

US 2018/0046796 A1  Feb. 15, 2018

Related U.S. Application Data

(60) Provisional application No. 62/374,384, filed on Aug. 12, 2016.

(51) Int. Cl.
| | |
|---|---|
| *G06F 21/45* | (2013.01) |
| *H04L 29/06* | (2006.01) |
| *G06F 21/57* | (2013.01) |
| *H04L 9/32* | (2006.01) |

(52) U.S. Cl.
CPC ............ *G06F 21/45* (2013.01); *G06F 21/577* (2013.01); *H04L 9/3268* (2013.01); *H04L 63/08* (2013.01); *H04L 63/10* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 7,089,584 B1 * | 8/2006 | Sharma | ................ | G06F 21/335 709/203 |
| 9,379,896 B1 * | 6/2016 | Altman | ................ | H04L 9/3236 |
| 2006/0026671 A1 * | 2/2006 | Potter | .................... | H04L 63/08 726/7 |
| 2006/0059361 A1 * | 3/2006 | Paden | ................... | H04M 3/382 713/184 |
| 2008/0098062 A1 * | 4/2008 | Balia | ................. | H04M 3/42161 709/203 |
| 2012/0060163 A1 * | 3/2012 | Khan | .................... | H04L 63/105 718/103 |
| 2013/0262858 A1 * | 10/2013 | Neuman | ................ | H04L 63/08 713/155 |
| 2015/0227878 A1 * | 8/2015 | Clay | ................ | G06Q 10/06393 705/7.39 |
| 2017/0346797 A1 * | 11/2017 | Yedidi | ..................... | H04L 63/06 |
| 2018/0007087 A1 * | 1/2018 | Grady | ................. | H04L 63/0428 |

* cited by examiner

Primary Examiner — Lynn D Feild
Assistant Examiner — Richard A McCoy

(57) ABSTRACT

A system and method includes at an authentication platform that is implemented via one or more computing servers: identifying compromised credential data, wherein compromised credential data comprise compromised credentials for one or more compromised accounts that have been exposed to a malicious actor via an illegitimate method, the compromised credentials including credentials that are useable for authentication to or for accessing the one or more compromised accounts; testing the compromised credentials, wherein testing compromised credentials includes using the compromised credentials to determine a useablility of the compromised credentials to attack one or more different accounts from the one or more compromised accounts; and modifying account access associated with one or more of (i) the one or more compromised accounts and (ii) the one or more different accounts.

20 Claims, 4 Drawing Sheets example.com

! This user's credentials have been detected in a recent breach.
The configuration policy has disabled this user's account.

Username: jdoe

Real Name: J Doe

E-mail: jdoe@example.com

Status  ○ Active
Require two-factor authentication (default)

○ Bypass
Skip two-factor authentication

● Disabled
Automatically deny access

METHODS FOR IDENTIFYING COMPROMISED CREDENTIALS AND CONTROLLING ACCOUNT ACCESS

CROSS-REFERENCE TO RELATED APPLICATIONS

This application claims the benefit of U.S. Provisional Application No. 62/374,384, filed 12 Aug. 2016, which is incorporated in its entirety by this reference.

TECHNICAL FIELD

This invention relates generally to the computer security field, and more specifically to a new and useful method for identifying compromised credentials and controlling account access.

BACKGROUND

Computer security vulnerabilities come in all shapes and sizes; resultantly, computer security strategy must be varied and diverse to protect against exploitation of those vulnerabilities. A common problem is the illegitimate obtainment (e.g., when a large website is breached by attackers) of user account credentials (e.g., a username and password), which can lead to fraud, identity theft, disclosure of sensitive information, and other undesired outcomes. The problem of compromised credentials is exacerbated by the common user behavior of reusing credentials. For example, a user might use a single set of credentials to access multiple services. Thus, even if a service locks a user account that is accessible by compromised credentials, an attacker may still be able to use the same compromised credentials to access other user accounts at other services.

Some services exist for handling compromised credentials. For example, compromised credential information can be fed into e-mailing systems that notify affected users through e-mail of the status of their account. However, these conventional approaches require users to sign up for such a service and fall short in providing effective options for ameliorating the damage of a compromised account.

Thus, there is a need in the computer security field to create new and useful methods for identifying compromised credentials and controlling account access associated with the credentials. This invention provides such new and useful methods.

BRIEF DESCRIPTION OF THE FIGURES

FIGS. 3-5 are example user interfaces presenting compromised credential data in variations of a method of a preferred embodiment.

DESCRIPTION OF THE PREFERRED EMBODIMENTS

Figure 1:
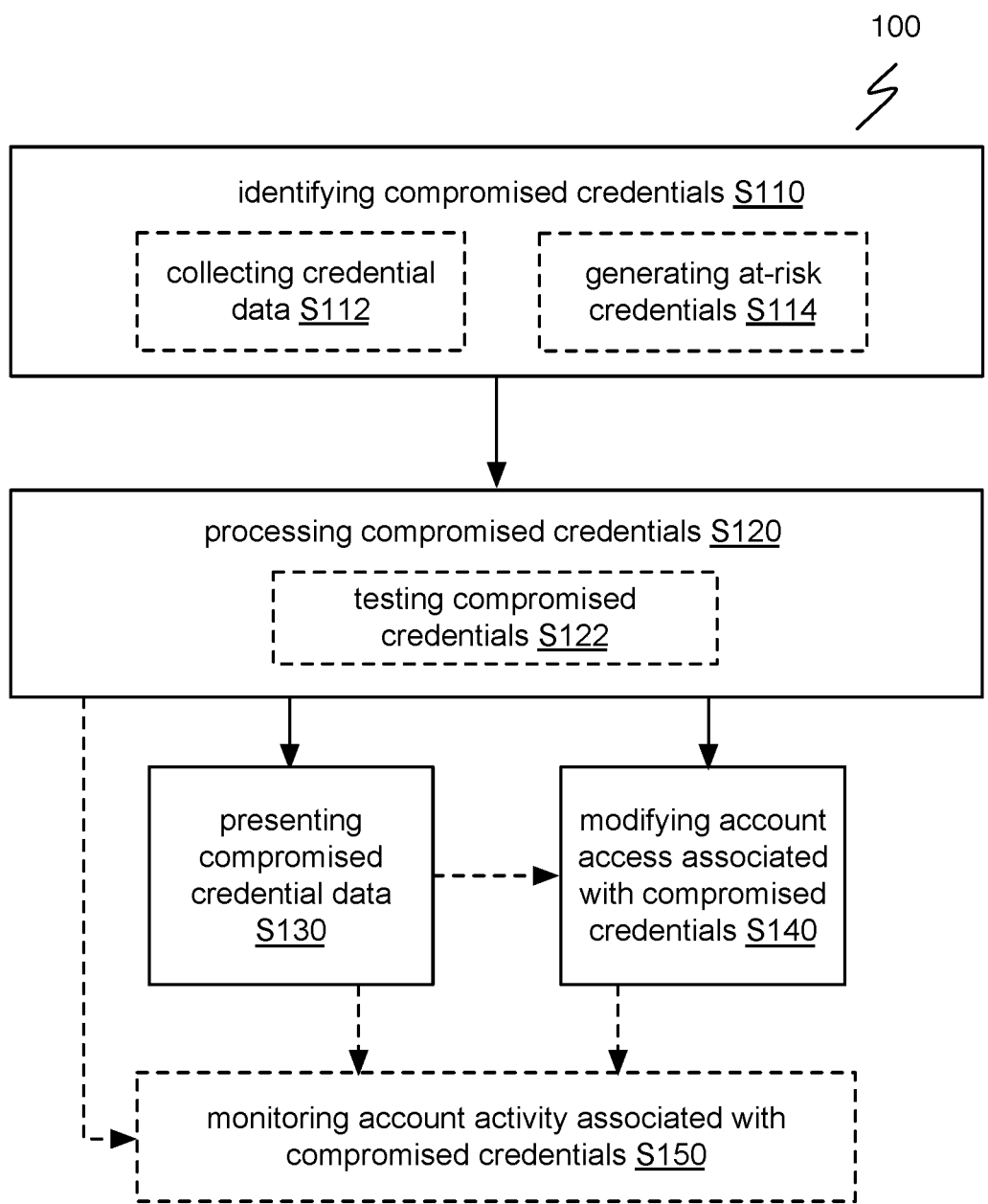
FIG. 1 is a schematic representation of a variation of a method of a preferred embodiment.
Figure 2:
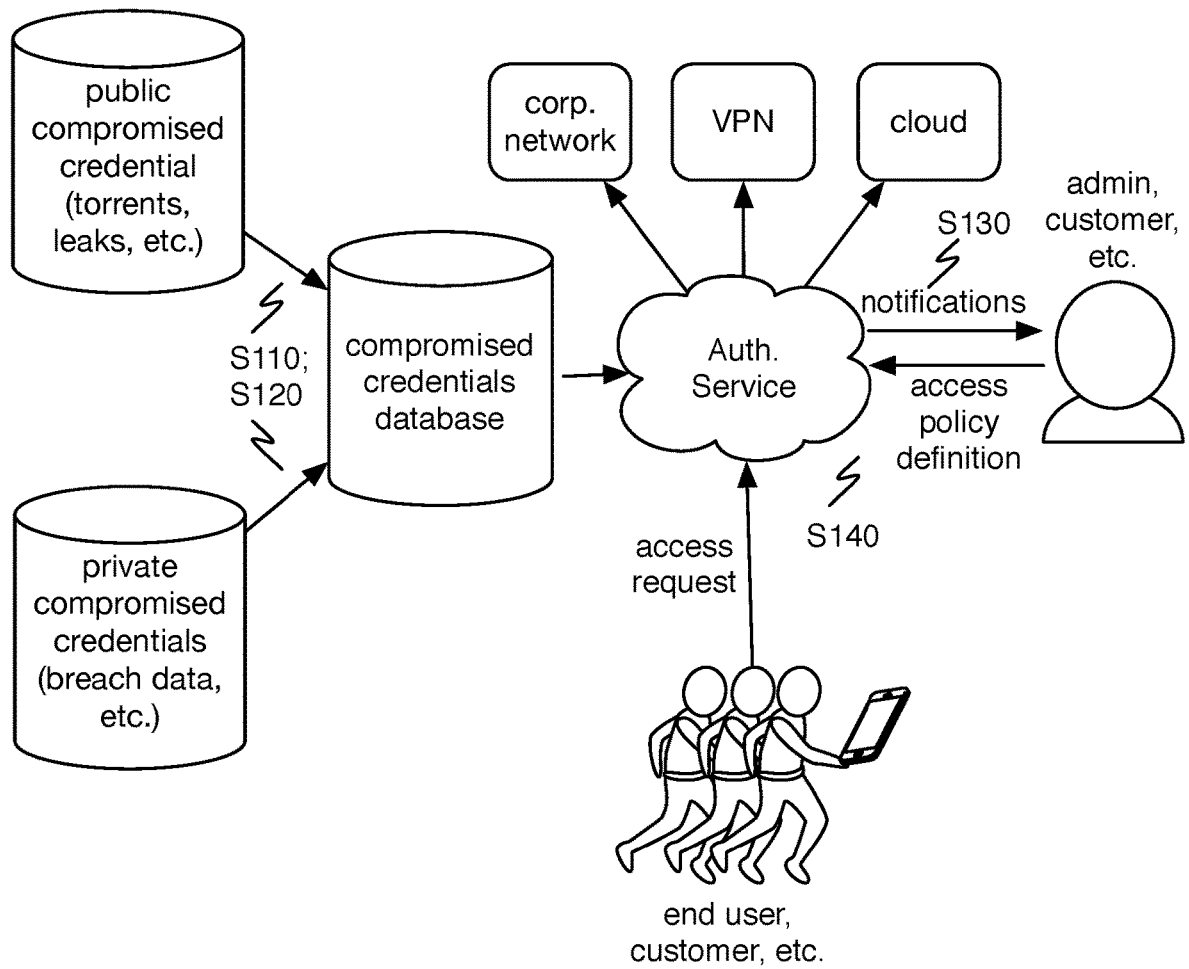
FIG. 2 is a schematic representation of a variation of a method of a preferred embodiment.

The following description of preferred embodiments of the invention is not intended to limit the invention to these preferred embodiments, but rather to enable any person skilled in the art to make and use this invention.
1. Method for Identifying Compromised Credentials and Controlling Account Access As shown in FIGS. 1-2, a method 100 for controlling account activity related to compromised credentials includes identifying compromised credentials S110, processing the identified compromised credentials S120, presenting compromised credential data S130, and modifying account access associated with the identified compromised credentials S140. The method 100 can additionally or alternatively include monitoring account activity associated with the identified compromised credentials S150.

As described in the background section, although approaches for addressing compromised credentials exist, they frequently lack in either or both of automation level and sophistication. For example, e-mailing systems frequently require users to sign up for the service, leading to inconvenience and smaller adoption of the security measure.

The method 100 functions to confer administrators and/or other legitimate entities with visibility and control regarding accounts associated with compromised credentials. In variations, the method 100 can function to identify compromised credentials and control account access without requiring intervention by a user (e.g., without requiring a user to sign up for security services). Further, in variations, the method 100 can function to automatically set account access policies, without manual intervention by an administrator. Further, in variations, the method 100 may be implemented by a cyber security and digital threat mitigation platform that functions to mitigate opportunities of cyber-attacks of users and/or user accounts having already compromised credentials or the like or users and/or user accounts having an association with compromised credentials.

All or portions of the method 100 (e.g., modifying account access related to compromised credentials S140) are preferably implemented by an authentication service functioning to act as a hosted multi-factor authentication platform. Additionally or alternatively, portions of the method 100 can be enabled by a web-based software platform operable on a web server or distributed computing system, and/or any suitable computer system capable of identifying compromised credentials and modifying account access associated with the identified compromised credentials. Additionally, or alternatively, any one or more portions of the method 100 may be implemented via one or more computer processors (e.g., CPUs, GPUs, or any suitable computer processor) and/or one or more systems having computer processors and/or one or more computing servers specifically configured or designed to implement the one or more portions of the method 100.

The authentication service is preferably a multitenant platform that enables multiple outside entities to leverage the service in handling multi-factor authentication. A developer of an application, website, or other networked service can preferably use the authentication service in registering, executing, and verifying two-factor authentication. Alternatively, the authentication service can be an internal authentication service used by a controlled set of services. For example, a social network platform may build out an authentication system within their system architecture. The authentication service preferably supports pushing a two-factor authentication (2FA) notification to an application, messaging, phone calls, and/or any suitable form authentication.

For example, as shown in FIG. 2, an authentication service can protect a third-party service with a security layer that must be overcome before access is granted to the third-party service (e.g., corporate network, VPN, cloud-based resources, etc.). As such, access requests can be received and handled (e.g., denied, allowed, require 2FA, require user action, etc.) by the authentication service in accordance with account access policies, the control of which can be supplied in S140 to administrators and/or other suitable entities. Alternatively, the authentication service can be configured in any manner.

1.1 Identifying Compromised Credentials.

As shown in FIGS. 1-2, S110 includes identifying compromised credentials. S110 functions to identify illicitly obtained credentials (e.g., credentials that have been accessed without the consent and/or knowledge of the owner of the credentials). As shown in FIG. 1, S110 can optionally include collecting credential data S112 and/or generating at-risk credentials S114.

Compromised credentials are preferably credentials that have been obtained by an illegitimate entity (e.g., an attacker, an unauthorized user, etc.). That is, in some embodiments, compromised credentials include credentials that may be obtained via unlawful means (e.g., a cyberattack) by a malicious actor and often for the purposes of perpetrating fraud (e.g., cyber fraud) and/or for various unlawful or malicious purposes (e.g., ransom, blackmail, etc.). The credentials in an uncompromised or compromised state may typically be utilized by a user or actor to access one or more secured resources (digital resources or physical resources, such as a building, etc.) or accounts (e.g., email account, online (or offline) banking account, secured computers or computing servers, any account accessible via the Internet or web, etc.) of a legitimate owner of the credentials.

Additionally or alternatively, compromised credentials are credentials that are at-risk of being used by an attacker. Credentials such as compromised credentials and/or at-risk credentials (e.g., generated in S114) can be any of one or more forms including: username and password, authentication seeds, security questions & answers, cryptographic keys, digital certificates, biometric credentials, other suitable authentication tokens, and/or any other type of credential.

Compromised credentials can be identified from any one or more of: internet scraping (e.g., search engine queries), database queries (e.g., queries against databases storing compromised credential data), credential dumps (e.g., pastebin, torrents, chatrooms, message forums, FTP sites, etc.), account marketplaces (e.g., auction websites, account trading forums, etc.), public sources, private sources, and/or through any other mechanism. For example, identifying compromised credentials can include maintaining a list of public compromised credential sources (e.g., pastebin sites, dumps of credential databases available from different torrent sites, etc.); periodically (e.g., every minute, hour, etc.) accessing the public sources to obtain the compromised credentials (e.g., by employing a web scraping bot to visit and scrape the public sources); and storing the compromised credentials at a remote server. In another example, identifying compromised credentials can include maintaining a database of access information (e.g., login credentials, website URLs, forum account information, etc.) for one or more private compromised credential sources; accessing the one or more private sources by using the access information; and downloading the compromised credentials to a remote server (e.g., for storage and further processing). In a variation, identifying compromised credentials can include receiving a compromised credentials submission (e.g., at a web interface) from a network administrator, security software provider, a user, a service (e.g., a service that experienced a breach), and/or other entity, where the compromised credentials submission includes one or more compromised credentials and/or credential data. In another variation, identifying compromised credentials can include collecting security status information (e.g., whether a breach has occurred, whether any accounts have been compromised, etc.) for a service. In this variation, security status information can be collected without identifying the compromised credentials themselves. However, S110 can alternatively include identifying compromised credentials with any mechanism.

A compromised credential is preferably associated with a user account corresponding to a service. Additionally or alternatively, compromised credentials can be associated with credential data (e.g., collected in S112), and/or other suitable information.

S110 can alternatively include identifying compromised credentials in any manner.

1.1.A Collecting Credential Data.

As shown in FIG. 1, S110 can optionally include S112, which includes collecting credential data. S112 functions to collect data related to one or more compromised credentials, to be used in subsequent processing and analysis in other portions of the method 100. For example, if a username and password are compromised for a first account of a first service, credential data indicating that the same username is used for a second account with a second service may be useful in determining that the second account is similarly compromised (e.g. if the user uses the same password for both accounts). In this example, a network administrator of the second service can be notified of the risk, and the administrator can handle the security vulnerability accordingly (e.g., through account access modification options supplied in S140). In another example, security history data associated with a compromised account can be leveraged in automatically setting and/or recommending an account access policy for the account (e.g., in S140). In a specific example, security history data indicating a history of previous attacker attempts on the compromised account can be presented to the network administrator, and used in recommending that the account be locked.

Credential data can include any one or more of: associated services (e.g., a service corresponding to the account accessible by the compromised credentials, etc.), security history associated with the compromised account (e.g., authentication attempts, security settings, authentication devices, password changes, history of previously compromised credentials, etc.), attack information (e.g., type of vulnerability leading to the credentials being compromised, type of attack, attacker information, manner in which the compromised credentials were released to the public, etc.), user profile data (e.g., name, demographic information, location, IP address, transaction history, social media profile data, etc.), associated temporal indicators (e.g., time of last login, time of public release of the compromised credentials, etc.), and/or any other data related to the compromised credentials and/or account.

Credential data can be collected through any one or more of web scraping, database queries, user submission, monitoring account activity (e.g., in S150), approaches used in S110, and/or through any suitable mechanism.

S112 can alternatively include collecting credential data in any manner.

1.1.B Generating At-risk Credentials.

As shown in FIG. 1, S110 can optionally include S114, which includes generating at-risk credentials. S114 functions to enumerate one or more credentials that are at-risk of being compromised.

At-risk credentials are preferably credentials that are vulnerable to being compromised by an illegitimate entity. Additionally or alternatively, at-risk credentials can be credentials that have been compromised, but have not been formally identified as compromised (e.g. through an approach of S110).

S110 preferably includes generating at-risk credentials by performing modification operations on compromised credentials (e.g., on a username, on a password, on a security answer, etc.). Modification operations can include any one or more of: symbol modification (e.g., ~, !, @, #, $, etc.), appending (e.g., adding "123", etc.), deletion, insertion, transposition, singularization/pluralization, context switching (e.g., changing a username that is a personal e-mail address to a work e-mail address), and/or any suitable modification operation. Additionally or alternatively, at-risk credentials can be generated from credential data (e.g., collected in S112), testing results (e.g., in S122), account activity data (e.g., monitored in S150), and/or other information in any manner.

S110 preferably implements a machine learning system that is capable of predicting likely at-risk credentials. The machine learning system may include one or more machine learning models (e.g., a machine learning ensemble) that was trained using one or more of the above-enumerated credentials modification methods and training samples of historically compromised credentials and variations of those historically compromised credentials that have been used or may have been used by a malicious actor to attack one or more accounts of legitimate users.

Accordingly, the generated at-risk credentials may be ranked by a system (e.g., authentication/cyber threat mitigation platform) implementing method 100 to expedite the process of detecting possible at-risk accounts associated with the at-risk credentials. In some embodiments, the at-risk credentials may be ranked according to the predictions generated by the machine learning system. In such embodiment, the machine learning system may generate the prediction of the at-risk credentials together with the probability (or likelihood) that the at-risk credentials may be used by a malicious actor to attack one or more accounts associated with the at-risk credentials. Of course, the generated or predicted at-risk credentials having the highest likelihood of malicious use may be ranked higher in a priority list or an at-risk credentials hierarchy, or the like.

Step S110 and/or any other suitable portion of the method 100 that can employ machine learning can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the method 100. Further, any suitable model (e.g., machine learning, non-machine learning, etc.) can be used in generating at-risk credentials and/or estimating a likelihood that existing credentials may be a likely candidate for a cyber-attack and/or other data relevant to the method 100.

At-risk credentials can be treated as compromised credentials (e.g., for subsequent processing and analysis in portions of the method 100), differently from compromised credentials, and/or used for any purpose. For example, at-risk credentials may trigger administrator review or restriction of an account (without disabling it); whereas compromised credentials may trigger immediate disabling of an account. The generated at-risk credentials may be presented to an administrator together with the compromised credentials used in the generation of the at-risk credentials.

S114 can alternatively include generating at-risk credentials in any suitable manner.

1.2 Processing Compromised Credentials.

As shown in FIGS. 1-2, S120 includes processing compromised credentials. S120 functions to process one or more compromised credentials (e.g., identified in S110) for use in modifying account access (e.g., in S140) and/or tracking account activity (e.g., in S150). S110 can additionally or alternatively include testing compromised credentials S122.

Processing compromised credentials S120 can include any one or more of: normalization (e.g., normalization of formatting, fields, records, etc.), mapping, de-duplication, cracking, storing (e.g., at a first-party database of an entity administering the authentication service; at a third-party database of a service using the authentication service, etc.), rating, tagging, testing (e.g., against a directory service), parsing, encrypting, decrypting, and/or any other suitable processing operation.

The mapping, according to processing compromised credentials S120, may include mapping the compromised credentials to the generated at-risk credentials and one or more related (cognate) credentials (and/or accounts) that have not yet been identified as compromised. The mapping may be used as input to identify user accounts that may require risk mitigation protocols to prevent future compromise or active compromise by a malicious actor. That is, the mapping may be used as input into the cyber threat mitigation platform to trigger the implementation of cyber threat mitigation protocols that function to perform one or more of modifying access controls to the identified user accounts (including to computer networks and/or digital resources of a service provider), providing notifications to administrators, providing notifications to users associated with the identified user accounts, and the like.

In a variation, S120 can include tagging one or more compromised credentials with any one or more of: services associated with the compromised account, credential data (e.g., collected in S112), account activity data (e.g., monitored in S150), risk ratings, testing results (e.g., from S122), and/or other suitable data. In an example, compromised credentials can be matched (or mapped) to other compromised credentials belonging to the same user. For example, a first compromised credential can be matched with a second compromised credential (e.g., based on sharing the same password, based on associated credential data, etc.). Matching data can be used to identify at-risk users (e.g., users re-using credentials across services), to inform network administrators of at-risk users (e.g., in S130), to guide account access policy selection (e.g., in S140), and/or for any suitable purpose.

In another variation, S120 can include generating and/or updating one or more risk metrics for one or more compromised credentials. A risk metric preferably indicates the likeliness (or probability) that a compromised credential will be used by an attacker, but may additionally or alternatively indicate any other measure of a risk associated with credential compromise (e.g., potential exposure due to compromise). Risk metrics can be generated and/or updated based on collected credential data (e.g., in S112), testing results (e.g., in S122), monitored account activity data (e.g., in S150), and/or other suitable data. For example, compromised credentials associated with payroll service accounts may be assigned a greater risk metric than compromised credentials associated with a message forum account. Risk metrics can be presented to a suitable entity (e.g., network administrator), used in automatically selecting and/or recommending account access policies (e.g., in S140), and/or used for any suitable purpose.

Additionally, or alternatively, the risk metrics may be generated using a machine learning system, as discussed in S110, S114. In some embodiments, S120 functions to use the machine learning system to generate the risk metrics for the existing compromised credentials rather than for the generated at-risk credentials. In this regard, using event data surrounding the circumstances of the events giving rise to the compromised credentials as input into the machine learning system, the machine learning system may function to generate risk metrics indicating a likelihood that the compromised credentials may be used to compromise another user account or credentials (e.g., at-risk credentials) of another user account.

Processing compromised credentials S120 can be performed in real-time (e.g., in response to identification of one or more compromised credentials; in response to testing compromised credentials in S122, etc.), at specified intervals (e.g., every day, week, etc.), and/or at any suitable time.

S120 can alternatively include processing compromised credentials in any manner.

1.2.A Testing Compromised Credentials.

As shown in FIG. 1, S120 can optionally include S122, which includes testing compromised credentials. S122 functions to test the usability of compromised credentials in attacks against associated users, computer or communication networks, and/or other components.

Testing a compromised credential can include any one or more of: checking the compromised credentials against an account directory (e.g., directory service, credential databases, etc.), enabling a third party (e.g., a service provider, an organization, a user) to check credentials against a database with compromised credentials identified in S110, verification with a user, administrator, and/or other entity, and/or any other suitable testing mechanism.

In a variation, S122 can include automatically testing a compromised credential against a directory service (e.g., Active Directory, single sign-on, etc.) of an organization or other entity. For example, S122 can include querying an Active Directory service for usernames associated with accounts in the network; and comparing the usernames to compromised account usernames identified in S110. In another variation, S122 can include using one or more identified compromised credentials to query a database including known compromised credentials (e.g., aggregators of compromised credentials, a first-party database created from compromised credentials identified in S110, etc.). In another variation, S122 can include enabling a third-party to test credentials against identified compromised credentials. This variation can include any one or more of: granting third-parties access to identified compromised credentials (e.g., through API requests), receiving credential information from third parties and checking the credential information against identified compromised credentials, and/or through any suitable mechanism.

Accordingly, in some embodiments, S122 functions to break down compromised credentials into credential component parts, such as a username component and a password component. S122 may function to execute the search, query, or comparison with either of the credential component parts of the compromised credentials in order to identify cognate user accounts or credentials that may be at-risk to be compromised in a separate attack (if these cognate user accounts have not been compromised already). In S122, when there is a match of at least one of the credential component parts of the compromised credentials with credentials of another account, S122 functions to indicate (e.g., via flagging, tagging, etc.) or surface the associated credentials and/or the account associated with the detected credentials.

Additionally, or alternatively, when performing S122, if both (or more) credential component parts (e.g., the username and password) of the compromised credentials matches both (or more) credential component parts of another set of credentials for another (cognate) account, S122 may function to automatically trigger one or more cyber-attack mitigation protocols (e.g., restricting access to cognate account, etc.) that function to prevent or mitigate an attack of the another (e.g., $2^{nd}$ account) account using the compromised credentials or the credentials of the cognate account. Accordingly, a system implementing one or more portions of the method 100 may be specifically configured with policy including the cyber-attack mitigation protocols that function to enable the system to detect partial and/or complete matches between compromised credentials and other credentials. When a complete match is detected by the system, the system may be further configured to automatically implement the cyber-attack mitigation protocols. Implementing the cyber-attack protocols enables the system to modify or restrict computer network access (or modify the computer network itself) and/or cognate account access and further, enables automatic notification processes to administrators and/or users of cognate accounts.

Cognate credentials, as referred to herein, relates to credentials that is related to compromised credentials based on the cognate credentials having at least one common credential component as the compromised credentials. For example, cognate credentials may include a username that is the same as a username of compromised credentials and thus, the cognate credentials may be designated as sharing a common credential component of the compromised credentials. A cognate account, as referred to herein, relates to an account that is identified as having cognate credentials. As mentioned previously, cognate credentials may be mapped to the compromised credentials.

S122 preferably includes generating testing results indicating the usability of the compromised credential by an attacker (e.g., whether the compromised credential can presently access an associated account). Testing results can be presented (e.g., in S130), used in selecting and/or guiding account access modification (e.g., in S140), and/or for any purpose.

Compromised credentials can be alternatively tested in any manner.

1.3 Presenting Compromised Credential Data.

As shown in FIGS. 1-2, S130 includes presenting compromised credential data. S130 functions to present compromised credentials (e.g., identified in S110) and/or other associated information to an administrator and/or other suitable entity.

S130 may additionally or alternatively include prompting administrators or users to take action in response to credential compromise and/or suggesting default or preferred actions to take in response to credential compromise. For example, Block S130 can include granting options to a user for modifying account access settings (e.g., in S140). In another example, suggesting an action can include recommending an account access policy setting (e.g., to help guide administrators in making an account access policy decision).

Accordingly, S130 may additionally or alternatively, include generating one or more suggestions (e.g., preferred actions) for mitigating attack threats posed by the compromised credentials. In some embodiments, the S130 may automatically generate threat mitigation policy that an administrator of a computer network or accounts may use to configure access controls to the computer or the accounts. In such embodiments, the threat mitigation policy may be accompanied by computer-executable instructions for automatically configuring one or more computers and/or computing servers to prevent attacks.

Figures 4, 5:
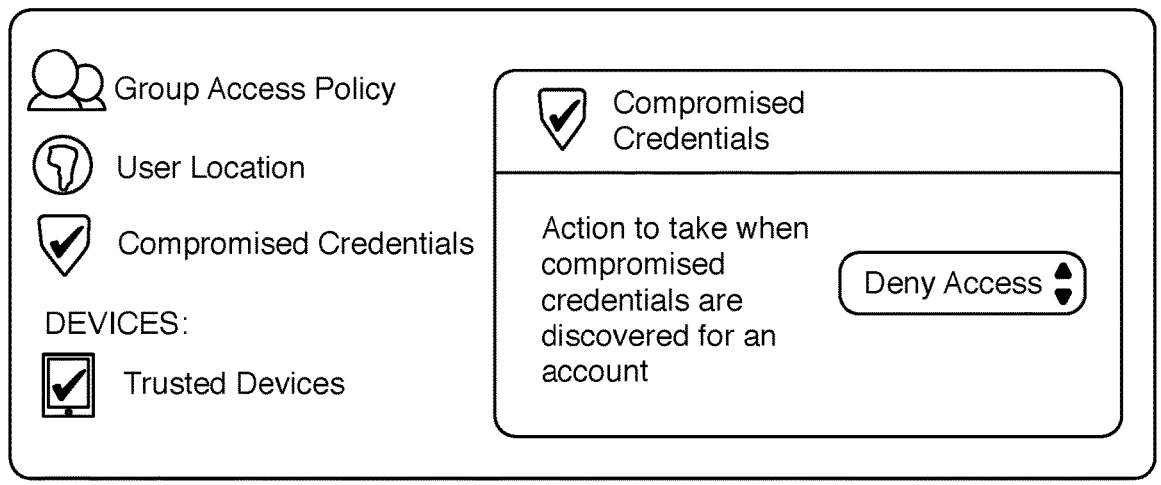

As shown in FIGS. 3-5, compromised credential data can include any one or more of: compromised credentials, credential data (e.g., collected in S112), risk ratings (e.g., determined in S120), testing results (e.g., generated in S122), and/or any other suitable information. For example, as shown in FIG. 3, presenting compromised credential data can include presenting an account username, associated real name, associated e-mail address, and options to configure account access settings (e.g., require 2FA, bypass 2FA, automatically deny access, etc.) for the account. In another example, presenting compromised credential data can include presenting an analysis of possible security vulnerabilities leading to the credentials being compromised (e.g., based on the source through which the compromised credentials were identified, credential data, etc.). In this example, the presentation of credentials may additionally or alternatively include account access policy, network access policy, and/or account configurations that function to prevent a similar attack against the compromised account and/or accounts having similar characteristics or attributes as the compromised account.

Compromised credential data is preferably presented to an administrator (e.g., a network administrator), but can additionally or alternatively be presented to a user, other individuals associated with a service, other associated services, security software providers (e.g., antivirus software providers), and/or other suitable entities.

Compromised credential data can be presented at a web interface, an application (e.g., a mobile computing device application), through notifications (e.g., e-mail, web notifications, text messages, etc.), and/or at any suitable venue.

S130 can alternatively include presenting identified compromised credentials in any manner.

1.4 Modifying Account Access.

As shown in FIGS. 1-2, S140 includes modifying account access associated with compromised credentials. S140 functions to modify the accessibility of one or more accounts associated with one or more compromised credentials.

Modifying account access S140 can include any one or more of: locking the account (e.g., permanently, temporarily, etc.), shutting down the account, resetting credentials, requiring user action (e.g., changing password, registering an authentication device, creating new security questions & answers, updating versions, configuring security settings, etc.), prompting a suitable entity (e.g., a service, a network administrator, etc.) to configure account access, modifying authentication difficulty, warning an entity (e.g., an end user), and/or other suitable action. Modifying authentication difficulty can include requiring multi-factor authentication, bypassing multi-factor authentication, performing authentication according to selected authentication parameters (e.g., requiring a particular authentication device type such as mobile phone authentication, requiring an authentication approach such as phone call authentication, etc.), requiring authentication through comparison of device digital fingerprints (e.g., comparing an authentication device digital fingerprint with a login device digital fingerprint, etc.), and/or any other suitable authentication modifications. Alternatively, account access policies can remain unchanged (e.g., account access policy to require 2FA remains the same before and after compromised credentials have been identified for an account). Modifying account access can include any elements analogous to those described in U.S. application Ser. No. 13/647,166 filed 8 Oct. 2012 and entitled "System and Method for Enforcing a Policy for an Authenticator Device", and U.S. application Ser. No. 14/955,377 filed 1 Dec. 2015 and entitled "System and Method for Applying Digital Fingerprints in Multi-Factor Authentication."

Additionally, or alternatively, S140 may function to modify one or more computers or a computer network configurations to mitigate risks that an attacker may use the compromised credentials to access computer network or computer resources once logged into an associated compromised account. In such instance, S140 may function to restrict access of the compromised credentials to one or more network components and/or resources. S140 may similarly implement such threat mitigation protocols to protect against attacks that may be committed using at-risk credentials or cognate credentials associated with the compromised credentials.

Account access modifications are preferably implemented through an authentication service (e.g., an authentication service used by a third-party service administering accounts associated with compromised credentials). For example, account access policy selections (e.g., by a network administrator of a third-party service using the authentication service) can be carried out by an authentication service that receives and processes access requests before granting access to the third-party service. In a specific example, the method 100 can include receiving an account access policy selection to deny all login attempts to an account associated with compromised credentials; receiving, at an authentication service, a login attempt with a username; comparing the username to compromised credentials associated with the third-party service; and in response to the username matching a compromised credential, denying the login attempt in accordance with the account access policy selection. Additionally or alternatively, S140 can include implementing account access policies through modifying settings (e.g., permissions, login restrictions, etc.) of the account itself, which can include guiding an administrator to modify the account settings (e.g., recommending an account access policy based on credential data), transmitting requests to modify the account access policy, and/or any other suitable action. Further, S140 can optionally including prompting security software providers (e.g., antivirus software providers, antiphishing software providers, etc.), other service providers, and/or other entities to restrict account access. S140 can alternatively include implementing account access modifications in any manner.

Modifying account access can be in response to a manual request (e.g., transmitted by an administrator at a web interface), can be automatically implemented (e.g., without intervention by an administrator), and/or performed at any suitable time.

In a variation, S140 can include receiving an account access policy selection by an entity (e.g., by a third-party service administrator, by a first-party, by an end user, etc.). Account access policy selections can include selections of any one or more of: specific policies (e.g., as shown in FIGS. 3-4), policy preferences (e.g., whether the administrator prefers more stringent or less stringent policies), policy rules (e.g., setting specific policies that are implemented in response to satisfaction of certain conditions indicated by collected credential data, risk rating, testing results, monitored account activity, etc.), and/or any other suitable selections. For example, the method 100 can include presenting account access policy options (e.g., in S130); receiving, from an administrator, an account access policy selected from the options; and modifying, through an authentication service, account access based on the selected account access policy. Different account access policy selections can be received for individual accounts, specific features of individual accounts (e.g., an account access policy used when the account is used to access a particular cloud application), groups of accounts (e.g., based on account type, based on compromised credential data, etc.), and/or for any suitable granularity associated with accounts. In examples, S140 can include receiving a set of account access policy selections. The set of account access policy selections can include different access policies to implement in different scenarios based on user action or inaction, credential data, monitored account activity, and/or other suitable data. In a specific example, S140 can include receiving a first account access policy selection that requires user action (e.g., resetting a user password), and receiving a second account access policy selection (e.g., requiring multi-factor authentication) to implement in response to user performance (successfully) of the user action. In another specific example, S140 can include receiving a less-stringent first account access policy selection (e.g., warning a user that the account may be compromised) to implement in the absence of unusual account activity, and receiving a more-stringent second account access policy selection (e.g., requiring enrollment of an authentication device) in response to collecting account activity data (e.g., in S150) indicating unusual account activity (e.g., frequent unsuccessful login attempts, etc.).

The account policy selections may be received a remote web interface or the like that is in operable communication with one or more computer servers of the authentication service. However, it shall be noted that the account policy selections may be received in any suitable manner.

In another variation, S140 can include automatically modifying account access (e.g., without manual account access policy selection by an administrator). Automatically modifying account access can include automatically selecting account access policies for one or more accounts based on based on collected credential data, risk rating, testing results, monitored account activity, and/or other suitable data. Accordingly, one or more of the computing servers of the authentication service may be configured, according to one or more predefined account access policies, to automatically modify account access of the compromised account, as well as at-risk accounts and cognate accounts. For example, S140 can include automatically selecting an account access policy based on a visibility level assigned to the compromised credentials associated with the account. The visibility level preferably indicates the degree to which the compromised credentials have been disseminated (e.g., based on the source of the compromised credentials, ease of identifying the compromised credentials, search engine results, etc.). In some embodiments, the authentication service is configured to determine the visibility level based on the collected credential data, as well as based on one or more of testing data, monitoring, and any suitable data relating to activities and circumstances associated with the one or more compromised (at-risk or cognate accounts) accounts. Accordingly, there may be a plurality of visibility levels defining a spectrum or continuum such that as you move along the continuum the amount of visibility increases or decreases depending on direction. In another example, automatically modifying account access can be based on compromised credential testing results (e.g., from S122). In a specific example, S140 can include implementing a less-stringent account access policy (e.g., warning a user of a service breach) for accounts with usernames not found in an identified compromised credentials database. In another specific example, S140 can include implementing a more-stringent account access policy (e.g., locking accounts) for accounts with usernames matching usernames in an identified compromised credentials database. S140 can alternatively include automatically modifying account access in any manner.

In another variation, S140 can include dynamically adjusting account access policies (by the authentication service or the like) based on user action or inaction, credential data, monitored account activity (e.g., in S150), and/or other suitable data. For example, a default account access policy of requiring 2FA can be adjusted to a policy of bypassing 2FA if a sufficient amount of time has passed without the compromised credentials being used. Accordingly, once compromised or potentially compromised credentials have been discovered, a default account access policy may be set together with a timer (via a timer circuit or the like) having a predetermined expiry may be set for the credentials or the associated account and once, the timer expires, the expiry may automatically trigger the implementation of a second account access policy for the account. In another example, an account access policy of warning a user can be adjusted to require multi-factor authentication in response to monitored account activity indicating a login request from an unknown IP address. Dynamically adjusting account access can be performed through decision tree models (e.g., branching operations based on monitored account activity, etc.), machine learning models (e.g., using features extracted from monitored account activity data, etc.), and/or any other suitable models.

In another variation, S140 may include modifying account access according to a security level or access level associated with compromised credentials. For example, S140 may include performing one set of account access modifications if a set of compromised credentials have user-level access and another set of account access modifications if a set of compromised credentials have administrator-level access.

In yet another variation, S140 may including modifying account access or selecting account access policy based on an amount or a number of cognate accounts and/or account mapped to the compromised credentials. For instance, if it is discovered that the compromised credentials can be used to access additional (cognate) accounts in addition to the already associated compromised account, these additional accounts may be mapped to the compromised credentials as related (cognate) accounts and/or at-risk accounts. Based on an amount and/or a number of additional accounts mapped to the compromised credentials, a system (e.g., authentication service) implementing S140 may automatically select an account access policy that may effectively mitigate the risk or prevent an attack of the compromised account as well as an attack of the additional accounts mapped to the compromised credentials.

S140 can alternatively include modifying account access in any manner.

1.5 Monitoring Account Activity.

As shown in FIG. 1, the system 100 can additionally or alternatively include S150, which includes monitoring account activity associated with identified compromised credentials. S150 functions to collect activity data relating to one or more compromised credentials and/or corresponding accounts, where the collected activity data can be used in modifying account access S140, identifying additional compromised credentials S110, and/or for any other suitable purpose. For example, a notification recommending a more stringent account access policy can be presented to an administrator (e.g., in S130) in response to collecting account activity data indicating access attempts from devices unassociated with the user. In another example, monitored account activity regarding attacker information (e.g., IP address, digital fingerprint, etc.) can be leveraged in generating an attacker block list, notifying third-party services (e.g., security software providers) of the attacker information, monitoring other access attempts originating from the attacker, and/or for any suitable purpose.

Account activity can include any one or more of: access attempt data (e.g., attempted login credentials, credential reset attempts, associated timestamps, etc.), information regarding the individual attempting to access the account (e.g., hardware type, software type, IP address, location, etc.), lookups (e.g., credential reminder attempts, search engine queries, directory service lookups, searches for the compromised credentials, etc.), associated network data (e.g., network traffic associated with the account, transferred data associated with the account, etc.), transactions associated with the account (e.g., sales transactions associated with the account, queries made by the account, etc.), and/or any other trackable data. Examples of monitored account activity data can include program execution, comparisons of created and/or executed processes with an authorized program list for the account, scheduled jobs (e.g., types of tasks, task time, etc.), access attempts to resources (e.g., whether the compromised account is attempting to access resources outside of the permission levels associated with the account, etc.), attempted policy modifications (e.g., group policy settings, account policy settings, audit policies, security monitoring settings, software restriction policies, encryption policies, wireless network policies, security settings, etc.), operating system use, virtual system use, and/or any other suitable account activity data.

Monitoring account activity S150 can be implemented by one or more of: an authentication service (e.g., recording security logs of access requests and associated information), a third-party service (e.g., through notifying and/or requesting the third-party service to perform a monitoring operation), and/or by any suitable entity.

S150 can alternatively include monitoring account activity in any manner.

The method of the preferred embodiment and variations thereof can be embodied and/or implemented at least in part as a machine configured to receive a computer-readable medium storing computer-readable instructions. The instructions are preferably executed by computer-executable components preferably integrated with a system for identifying compromised credentials and controlling account access. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A computer-implemented method for securing an online account from a potential cyber-attack, the computer-implemented method comprising:
   at a remote authentication service:
   maintaining a plurality of online accounts, wherein each online account of the plurality of online accounts is associated with a corresponding set of credentials and a corresponding service provider of a plurality of remote service providers associated with the remote authentication service, and wherein each corresponding service provider contains a corresponding online account access policy defining one or more mitigation actions to be implemented by the remote authentication service and including online access requirements that govern access to the each corresponding service provider:
   collecting, via one or more networks, a set of compromised credentials of a first online account, from the plurality of online accounts, that is associated with a first service provider, wherein the set of compromised credentials is collected from one or more repositories known to include compromised credentials;
   identifying a first credential component of the set of compromised credentials, the first credential component comprising a username of the compromised credentials;
   identifying a second credential component of the set of compromised credentials, the second credential component comprising a passcode of the compromised credentials;

identifying a second plurality of online accounts including the plurality of online accounts and not including online accounts corresponding to the first service provider;

testing the first credential component and the second credential component against each corresponding set of credentials for each of the second plurality of online accounts;

detecting, by the remote authentication service, a match between (i) one or more of the first credential component and the second credential component of the set of compromised credentials and (ii) one or more of a first credential component and a second credential component of a vulnerable one of the each corresponding set of credentials for each of the second plurality of online accounts;

in response to the detecting the match, automatically tagging one of the plurality of online accounts corresponding to the detected vulnerable credentials and a corresponding second service provider of the plurality of remote service providers as an at-risk online account, wherein the at-risk online account relates to an online account having credentials vulnerable to being compromised in a potential cyber-attack;

implementing a mitigation process for the at-risk online account, comprising:

authenticating the remote authentication service with a computing device of the second service provider to access and modify the included online access requirements of the at-risk online account;

in response to being authenticated by the computing device, reading, by the remote authentication service, the corresponding online account access policy and the corresponding one or more mitigation actions from the computing device;

determining that the remote authentication service is capable of modifying the included online access requirements of the at-risk online account according to the read policy and the corresponding one or more mitigation actions; and in response to the determination, modifying the included online access requirements of the second service provider by implementing the read one or more mitigation actions to protect the second service provider from the potential cyber-attack.

2. The method of claim 1, wherein collecting compromised credentials includes periodically collecting, via the one or more networks, the compromised credentials from the one or more repositories known to comprise compromised credentials, wherein the one or more repositories known to comprise compromised credentials include public sources and private sources that are accessible via Internet.

3. The method of claim 1, further at the remote authentication service:

configuring a compromised credentials database that stores compromised credential data processed into a normalized format, wherein processing the compromised credential data into the normalized format includes:

augmenting the compromised credentials data with one or more of services associated with the compromised credentials data and account activity data.

4. The method of claim 1, wherein testing the compromised credentials further includes checking the compromised credentials against one or more of an account directory and a directory service of the service provider for each of one or more of the plurality of online accounts to determine whether any credential components of the compromised credentials matches one or more credential components associated with credentials of online accounts in the account directory or the directory service.

5. The method of claim 1, further at the remote authentication service:

presenting the compromised credentials including presenting one or more account access policy settings that are used to modify access to the online account associated with the compromised credentials.

6. The method of claim 1, wherein selecting one of a plurality of online account access policies includes:

selecting an account access policy that requires user action prior to accessing the online account;

or selecting an account policy that requires implementing, in response to a user successfully performing a user action, multi-factor authentication prior to accessing the online account.

7. The method of claim 1, further comprising, at the remote authentication service:

generating a visibility level for the compromised credentials, wherein the visibility level indicates a degree to which the compromised credentials have been disseminated, wherein reading the corresponding online account access policy is based on the generated visibility level for the compromised credentials.

8. The method of claim 1, further at the remote authentication service:

monitoring one or more compromised accounts, wherein the monitoring includes identified account activity involving a use of compromised credentials to access one or more associated accounts and capturing the account activity of the one or more associated accounts; and in response to capturing the account activity, automatically alerting one or more service providers associated with the one or more associated accounts and providing an account activity report comprising an indication of the captured account activity.

9. The computer-implemented method according to claim 1, wherein automatically selecting the corresponding online account access policy includes:

selecting a less stringent online access policy if only one of the first credential component and the second credential component of the compromised credentials of the first online account matches one of the first credential component and the second credential component of a second online account; and selecting a more-stringent online access policy distinct from the less stringent online access policy of the plurality of online account access policies if both of the first credential component and the second credential component of the compromised credentials of the first online account matches both of the first credential component and the second credential component of the second online account.

10. An apparatus comprising:

a communication interface configured to enable network communications;

one or more computer processors associated with a remote authentication service;

one or more computer readable storage media;

program instructions stored on the one or more computer readable storage media for execution by at least one of the one or more computer processors, that when executed by the one or more computer processors, cause the one or more computer processors to:

maintain a plurality of online accounts, wherein each online account of the plurality of online accounts is associated with a corresponding set of credentials and a corresponding service provider of a plurality of remote service providers associated with the remote authentication service, and wherein each corresponding service provider contains a corresponding online account access policy defining one or more mitigation actions to be implemented by the remote authentication service and including online access requirements that govern access to the each corresponding service provider;

collect, via one or more networks, a set of compromised credentials of a first online account, from the plurality of online accounts, that is associated with a first service provider, wherein the set of compromised credentials is collected from one or more repositories known to include compromised credentials;

identify a first credential component of the set of compromised credentials, the first credential component comprising a username of the compromised credentials;

identify a second credential component of the set of compromised credentials, the second credential component comprising a passcode of the compromised credentials;

identify a second plurality of online accounts including the plurality of online accounts and not including online accounts corresponding to the first service provider;

test the first credential component and the second credential component against each corresponding set of credentials for each of the second plurality of online accounts;

detect, by the remote authentication service, a match between (i) one or more of the first credential component and the second credential component of the set of compromised credentials and (ii) one or more of a first credential component and a second credential component of a vulnerable one of the each corresponding set of credentials for each of the second plurality of online accounts;

in response to the detecting the match, automatically tag one of the plurality of online accounts corresponding to the detected vulnerable credentials and a corresponding second service provider of the plurality of remote service providers as an at-risk online account, wherein the at-risk online account relates to an online account having credentials vulnerable to being compromised in a potential cyber-attack;

implement a mitigation process for the at-risk online account, wherein implementing the mitigation process causes the one or more computer processors to:

authenticate the remote authentication service with a computing device of the second service provider to access and modify the included online access requirements of the at risk online account:

in response to being authenticated by the computing device, read, by the remote authentication service, the corresponding online account access policy and the corresponding one or more mitigation actions from the computing device;

determine that the remote authentication service is capable of modifying the included online access requirements of the at-risk online account according to the read policy and the corresponding one or more mitigation actions; and in response to the determination, modify the included online access requirements of the second service provider by implementing the read one or more mitigation actions to protect the second service provider from the potential cyber-attack.

11. The apparatus of claim 10, wherein the program instructions further cause the one or more processors to:

configure a compromised credentials database that stores compromised credential data processed into a normalized format, wherein processing the compromised credential data into the normalized format causes the one or more processors to:

augment the compromised credentials data with one or more of services associated with the compromised credentials data and account activity data.

12. The apparatus of claim 10, wherein the program instructions to test the compromised credentials further cause the one or more processors to check the compromised credentials against one or more of an account directory and a directory service of the service provider for each of one or more of the plurality of online accounts to determine whether any credential components of the compromised credentials matches one or more credential components associated with credentials of online accounts in the account directory or the directory service.

13. The apparatus of claim 10, wherein the program instructions to present the compromised credentials further cause the one or more processors to:

presenting one or more account access policy settings that are used to modify access to the online account associated with the compromised credentials.

14. The apparatus of claim 10, wherein the program instructions to select one of a plurality of online account access policies cause the one or more processors to:

select an account access policy that requires user action prior to accessing the online account;

or select an account policy that requires implementing, in response to a user successfully performing a user action, multi-factor authentication prior to accessing the online account.

15. One or more non-transitory computer readable storage media encoded with instructions that, when executed by one or more processors associated with a remote authentication service, cause the one or more processors to:

maintain a plurality of online accounts, wherein each online account of the plurality of online accounts is associated with a corresponding set of credentials and a corresponding service provider of a plurality of remote service providers associated with the remote authentication service, and wherein each corresponding service provider contains a corresponding online account access policy defining one or more mitigation actions to be implemented by the remote authentication service and including online access requirements that govern access to the each corresponding service provider;

collect, via one or more networks, a set of compromised credentials of a first online account, from the plurality of online accounts, that is associated with a first service provider, wherein the set of compromised credentials is collected from one or more repositories known to include compromised credentials;

identify a first credential component of the set of compromised credentials, the first credential component comprising a username of the compromised credentials;

identify a second credential component of the set of compromised credentials, the second credential component comprising a passcode of the compromised credentials;

identify a second plurality of online accounts including the plurality of online accounts and not including online accounts corresponding to the first service provider;

test the first credential component and the second credential component against each corresponding set of credentials for each of the second plurality of online accounts;

detect, by the remote authentication service, a match between (i) one or more of the first credential component and the second credential component of the set of compromised credentials and (ii) one or more of a first credential component and a second credential component of a vulnerable one of the each corresponding set of credentials for each of the second plurality of online accounts;

in response to the detecting the match, automatically tag one of the plurality of online accounts corresponding to the detected vulnerable credentials and a corresponding second service provider of the plurality of remote service providers as an at-risk online account, wherein the at-risk online account relates to an online account having credentials vulnerable to being compromised in a potential cyber-attack;

implement a mitigation process for the at-risk online account, wherein implementing the mitigation process causes the one or more computer processors to:

authenticate the remote authentication service with a computing device of the second service provider to access and modify the included online access requirements of the at- risk online account;

in response to being authenticated by the computing device, read, by the remote authentication service, the corresponding online account access policy and the corresponding one or more mitigation actions from the computing device:

determine that the remote authentication service is capable of modifying the included online access requirements of the at-risk online account according to the read policy and the corresponding one or more mitigation actions; and in response to the determination, modify the included online access requirements of the second service provider by implementing the read one or more mitigation actions to protect the second service provider from the potential cyber-attack.

16. The one or more non-transitory computer readable storage media of claim 15, wherein the instructions to collect compromised credentials cause the one or more processors to periodically collect, via the one or more networks, the compromised credentials from the one or more repositories known to comprise compromised credentials, wherein the one or more repositories known to comprise compromised credentials include public sources and private sources that are accessible via Internet.

17. The one or more non-transitory computer readable storage media of claim 15, wherein the instructions further cause the one or more processors to:

configure a compromised credentials database that stores compromised credential data processed into a normalized format, wherein processing the compromised credential data into the normalized format causes the one or more processors to:

augment the compromised credentials data with one or more of services associated with the compromised credentials data and account activity data.

18. The one or more non-transitory computer readable storage media of claim 15, wherein the instructions to test the compromised credentials further cause the one or more processors to check the compromised credentials against one or more of an account directory and a directory service of the service provider for each of one or more of the plurality of online accounts to determine whether any credential components of the compromised credentials matches one or more credential components associated with credentials of online accounts in the account directory or the directory service.

19. The one or more non-transitory computer readable storage media of claim 15, wherein the instructions to select one of a plurality of online account access policies cause the one or more processors to:

select an account access policy that requires user action prior to accessing the online account;

or select an account policy that requires implementing, in response to a user successfully performing a user action, multi-factor authentication prior to accessing the online account.

20. The apparatus of claim 10, wherein the program instructions to collect compromised credentials cause the one or more processors to periodically collect, via the one or more networks, the compromised credentials from the one or more repositories known to comprise compromised credentials, wherein the one or more repositories known to comprise compromised credentials include public sources and private sources that are accessible via Internet.

* * * * *

UNITED STATES PATENT AND TRADEMARK OFFICE
CERTIFICATE OF CORRECTION

PATENT NO. : 10,558,797 B2
APPLICATION NO. : 15/659864
DATED : February 11, 2020
INVENTOR(S) : Jordan Wright et al.

Page 1 of 1

It is certified that error appears in the above-identified patent and that said Letters Patent is hereby corrected as shown below:

In the Claims

Claim 1, Column 14, Line 52, please replace "service provider:" with --service provider;--

Claim 10, Column 17, Line 60, please replace "at risk" with --at-risk--
Claim 10, Column 17, Line 60, please replace "online account:" with --online account;--

Claim 15, Column 19, Line 44, please replace, "computing device:" with --computing device;--

Signed and Sealed this
Thirtieth Day of June, 2020

Andrei Iancu
*Director of the United States Patent and Trademark Office*